Oct. 30, 1962

S. P. KINNEY 3,061,292

BLAST HEATING SYSTEM FOR BLAST FURNACES
AND METHOD OF OPERATING THE SAME

Filed June 22, 1959

INVENTOR.
Selwyne P. Kinney

BY

ATTORNEYS

INVENTOR.
Selwyne P. Kinney

United States Patent Office 3,061,292
Patented Oct. 30, 1962

3,061,292
BLAST HEATING SYSTEM FOR BLAST FURNACES AND METHOD OF OPERATING THE SAME
Selwyne P. Kinney, Pittsburgh, Pa., assignor to S. P. Kinney Engineers, Inc., Carnegie, Pa., a corporation of Pennsylvania
Filed June 22, 1959, Ser. No. 821,927
3 Claims. (Cl. 263—19)

This invention relates generally to blast furnaces and is for an improvement in heating the air blast for use in such furnaces.

In recent years there have been many improvements designed to increase the productive capacity of existing, as well as new, blast furnace installations. Some of these improvements are in the preparation of the burden in the furnace so as to secure better passage of gases through the burden, such as the use of sinter or pelletizing the ore; the use of more uniformly graded materials, and the so-called "pre-digested" burden. Other expedients involve the use of oxygen and the addition of steam to the blast. These improvements are all directed toward increasing the rate of reduction or the amount of wind or blast that the furnace will take, resulting in the increased iron production.

Blast furnace installations have been built in the past with three or four stoves, usually four, to meet the needs of the furnace. According to former practice, where the amount of hot blast was limited, the air was generally heated in the stoves to temperatures ranging between 800° and 1200° F. In rare instances blast temperatures as high as 1500° F. have been used, but as a rule low blast temperatures were employed because of the inability of the furnace to use the heat.

The improved practices above mentioned have resulted in a demand for increased heat and higher blast temperatures which the stoves cannot supply. The construction of the stove constitutes a material limiting factor to the amount of heat that can be supplied.

The conventional stove comprises a hollow cylindrical tower ranging in height usually between 80 and 100 feet with a spherical dome at the top. Inside the tower there is a vertical combustion chamber so that air and gas may be burned therein and discharged under the top of the stove and be deflected downwardly through a mass of checker brick filling the tower except for the combustion chamber. The checker work is supported on a metal grid structure which in turn is supported on vertical steel columns, providing a large chamber under the checker brick into which the combustion gases flow to be withdrawn through a duct leading from the chamber to a stack. In this way, the checker brick is heated, the brickwork at the top being most highly heated, but as the gases travel down through the checker brick they become cooler and by the time they reach the supporting grid at the bottom they must not exceed 650° or 700° F. lest they overheat and weaken the steel work supporting the column of checker brick.

On the blowing cycle, air is admitted to the chamber under the checker brick, travels up through the heated brickwork and is thereby heated, being withdrawn through the combustion chamber for delivery to the blast furnace, while another stove is placed on the firing or heating-up cycle.

In my joint patent with Louis M. Hartwick, No. 2,542,680, granted February 20, 1951, there is disclosed a stove in which the steel supporting structure under the checker brick is water-cooled. This enables the hot gases on the heating-up phase of the operating cycle of the stove to pass down through the checker brick and to enter the chamber under the supporting grid at a higher temperature, so that the checker bricks can be highly heated further down toward the supporting structure to thereby increase the heat transfer capacity of the stove.

The present invention has for its object to increase the heat output of the stove, or supplement it by preheating the blast air before it is introduced into the stove, whereby no part of the checker brick is cooled down to the temperature of the ambient air. Thus, the air is heated to higher temperature.

A further object of the present invention is to utilize the water-cooled supporting structure of the patent above referred to with preheated air so that the preheated air may enter the stove at a higher temperature than would otherwise be safe.

A further object of this invention is to further increase the heat output of the stove by dividing the input of preheated air so that a cooler portion enters the chamber below the brickwork, and a hotter portion is conducted directly into the brickwork.

These and other objects and advantages are secured by my invention as will be more fully understood by those skilled in the art from the following detailed description in conjunction with the accompanying drawings wherein.

Figure 1:
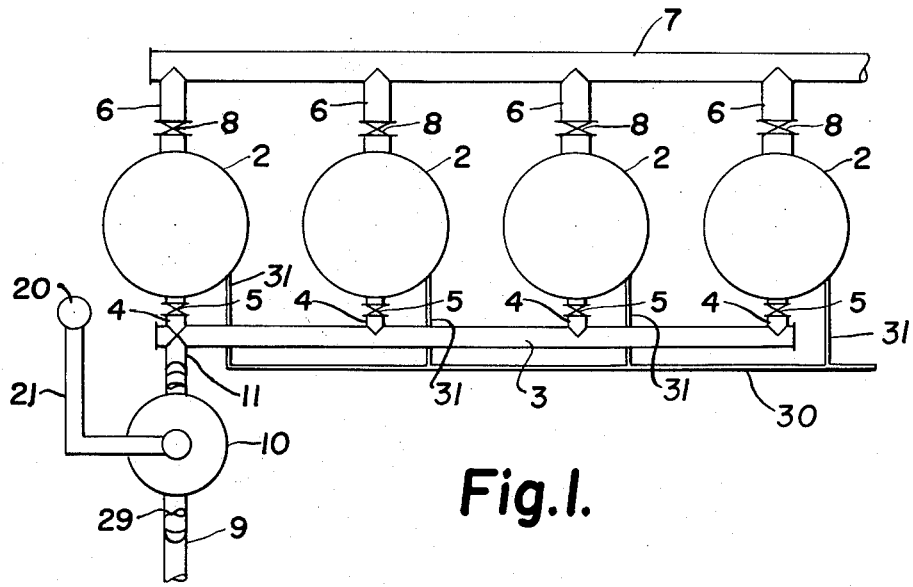
FIG. 1 is a schematic view of a blast furnace stove system and air preheater for effecting the present invention.

Referring first to FIG. 1, it shows more or less diagrammatically and in plan view a typical blast furnace stove system comprising four stoves, each designated 2, and which are of similar construction. They are generally arranged in a line and there is a manifold 3 that extends along one side of the stove, the manifold having a branch pipe 4 leading into the bottom of each stove. There is a blast shut-off valve 5 in each of the branch pipes 4. There are air outlet pipes 6 leading from the opposite side of each stove near the bottom thereof through which hot blast is carried to a manifold 7 from whence it flows to the burner of a blast furnace (not shown). Each of the pipes 6 may be provided with a valve 8 which is usually a gate valve. The pipe 6 leads from the combustion chamber of the stove, the stove being of the general construction shown in my prior Patent No. 2,542,680 above referred to, and particularly FIG. 1 thereof. There is usually a burner and a fuel inlet pipe directly below the pipe 6 and not shown in the diagram, but which is arranged as shown in the patent aforesaid.

Figure 4:
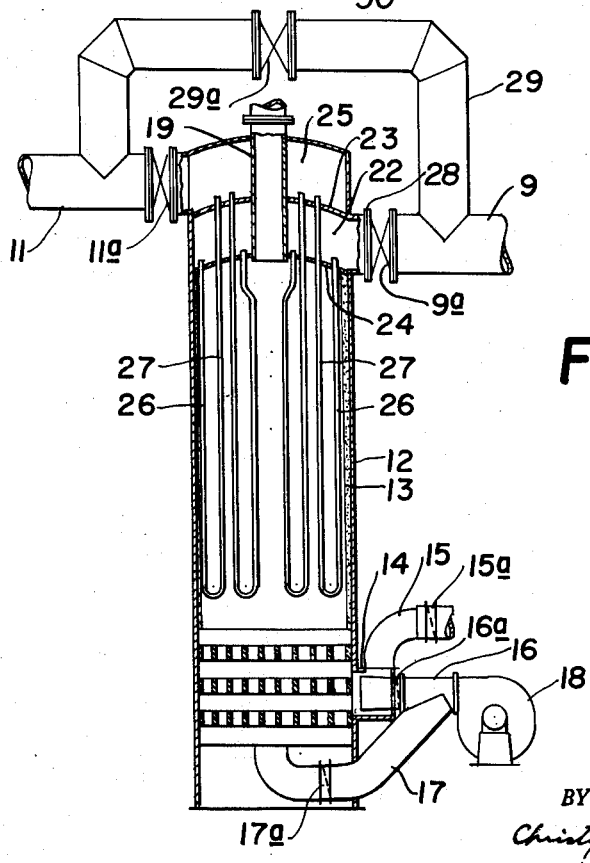
FIG. 4 is a vertical section through one form of air preheater.

According to the present invention there is a pipe 9 which leads from the cold blast blower into a heat exchanger designated 10 where the air is preheated. It leaves the heat exchanger through a pipe 11 which connects to the manifold 3. The heat exchanger 10 may be of any suitable construction in which blast furnace gas is used as fuel, or it may utilize waste heat. Since blast furnace gas is generally available, I prefer to use it. In FIG. 4 I have shown one form of blast preheater which I may use for this purpose. It comprises a generally cylindrical casing 12 having a refractory lining 13 therein. Near the bottom of the casing there are a few courses of basket weave checker brick. A blast furnace type burner designated generally as 14 opens into the casing so as to direct the flames into the brickwork. The burner is supplied with gas through pipe 15 and with primary combustion air through a pipe 16, while secondary air may be supplied through pipe 17, the pipes 16 and 17 both being connected to a blower 18. The pipe 15 is provided with a butterfly valve 15a for controlling the gas flow; the pipe 16 is provided with a butterfly valve 16a for controlling the primary air supply to the burner, and the pipe 17 is provided with a butterfly valve 17a for controlling the flow of secondary air. The hot gases of combustion rise up through the cylindrical shell 12, and in the center of the top there is an outlet pipe 19 which may lead to a stack. This may connect into the usual stack provided alongside the blast furnace stoves, or it may discharge into a separate stack. The stack in FIG. 1 is designated 20, 21 being the flue connection from the pipe 19 to the stack.

Inside the casing 12 near the top is a chamber 22 located between partition walls 23 and 24 extending in a generally horizontal direction across the inside of the structure. A second chamber 25 is provided in the very top of the structure between the partition 23 and the top wall of the casing. A plurality of U-shaped tubes of heat-resistant metal have a shorter leg 26 that opens into the chamber 2 and a longer leg 27 that opens into the chamber 25. The pipe 9 leading from the cold blast blower is connected at 28 to the structure so as to discharge cold air into the chamber 22. This air flows down the tubes 26 and up the other leg of these tubes and discharges into the chamber 25. The tubes 26—27 are enveloped in an atmosphere of hot combustion gases so that the air in traveling through the combustion is heated. Pipe 11 leads from the chamber 25, connecting with the manifold 3, as heretofore explained.

As shown in FIG. 4 there may be a bypass pipe 29 leading around the heat exchanger from the pipe 9 to the pipe 11. There is a valve 9a in the pipe 9, a valve 29a in the bypass pipe 29, and a valve 11a in the pipe 11, these valves being so located that when it is desired to take the preheater out of service without shutting down the blast furnace, as may from time to time be desirable, the valves 9a and 11a can be closed and the valve 29a opened so that the cold blast will bypass the preheater.

As explained above, the usual blast furnace stove has a supporting structure above which is carried a column of checker brick, and this supporting structure is usually formed of structural metal posts so as to provide a chamber underneath the brickwork, as clearly described in the patent above referred to. If the conventional stove construction be employed, the air discharged through the manifold 11 into the bottom of the stoves should not exceed 600° F. because if it goes much higher there is danger that the structural steel will collapse.

In FIG. 1 I have shown a steam pipe 30 having a branch 31 leading into the bottom of each stove. In present-day blast furnace practise it is frequently desirable to introduce steam into the hot blast, and with the present invention the steam can be introduced into the bottom of the stove where it will mix with the heated air and may be used to some extent to control the temperature of the air in the chamber under the brickwork, and it may also help to cool the structural members.

By preheating the air in the manner above described the brickwork in the stove need never be cooled to the ambient temperature of the outside air. In other words, the coolest portion of the brickwork may always be at a temperature of at least 600° F. As a result of this the checker bricks are not so rapidly cooled by the incoming blast, and the outgoing temperature of the air can be effectively heated to at least 1500° F. with little danger of impairing the stove, and keep the stove longer on the blast heating cycle.

In order to prevent damage to the structural support for the brickwork in the stove and enable the air to be preheated to an even higher temperature than 600° F., I may cool the supporting structural framework either by water or by steam utilizing a system of cooling such as disclosed in the Kinney and Hartwick patent above referred to. This is illustrated generally in FIG. 2 in which 35 designates the brickwork on the interior of the stove, the shell of which is designated 36. 37 designates a grid construction in the form of parallel channels supported on transverse beams 38. These beams in turn are carried on posts 39. As more fully disclosed in FIGS. 2 and 3 in the patent above referred to, the channels 37 may have plates secured to the opposite faces of the channel to provide enclosed ducts for the circulation of water therethrough. The I-beams 38 may have plates 38a spanning the flanges forming water-circulating passages along the webs of the I-beams, the webs of the I-beams being perforated at selected points to permit water to flow from one side of the web to the other. As shown in the aforesaid patent, the grid elements can be connected in series so that water flows from one structural member to the next, and the beams can be connected in series so that the water or cooling fluid flows from one to the next. A water supply pipe leading to beam 37 is indicated at 37a. It is provided with a flow control valve 37b. At 37c is a water discharge pipe from which water may flow into drain 37d to give a visible flow indication, or it may be diverted through valve 36e to a drain. Likewise the columns 39 which are formed of I-beams may be of the structure shown to provide a vertical passage 39a down each side of the web of the column, the column also being an I-beam, and there is a system for circulating water through these. The arrangement being generally similar to that shown in the Kinney and Hartwick patent, it need not be here described in detail.

In the Kinney and Hartwick patent above referred to, the water-cooling of the supporting structure for the brickwork is provided so that when the gases of combustion used to heat the brickwork flow down into the chamber 40 to be carried from there to the stack off-take pipe, gases can be at a temperature above 600° F. so as to "draw" the heat of gases further down into the column of brickwork without endangering the supporting structure. In the present invention the cooling of the under structure of the brickwork not only enables the gases of combustion to be hotter when they emerge from the brickwork and flow into the chamber 40, but it enables the air to be heated to a higher temperature and introduced into the stove at a temperature substantially above 600° F. so that the stove may always be operated at a higher temperature, and the air from the blast furnace thus heated to a higher temperature.

Figure 3:
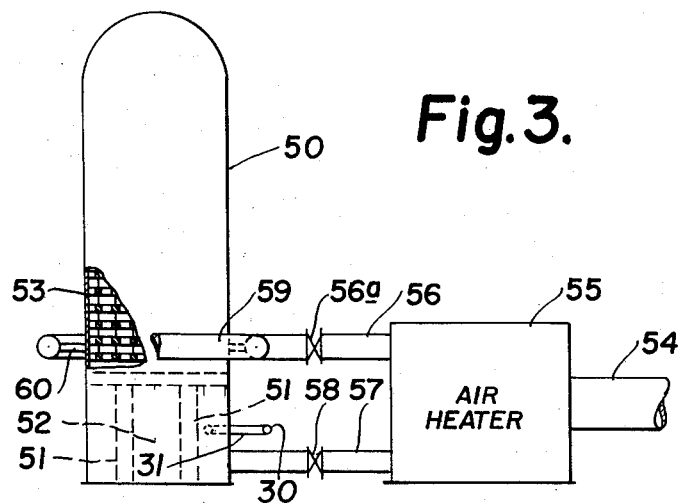
FIG. 3 is a schematic vertical section through a stove for use in the system shown in FIG. 1 wherein the air is divided with a cooler portion entering in the usual way, and the hotter portion being introduced into the checker bricks above the bottom.

In FIG. 3 I have not shown the brickwork, since any usual or preferred type of checker brick construction may be employed.

Figure 2:
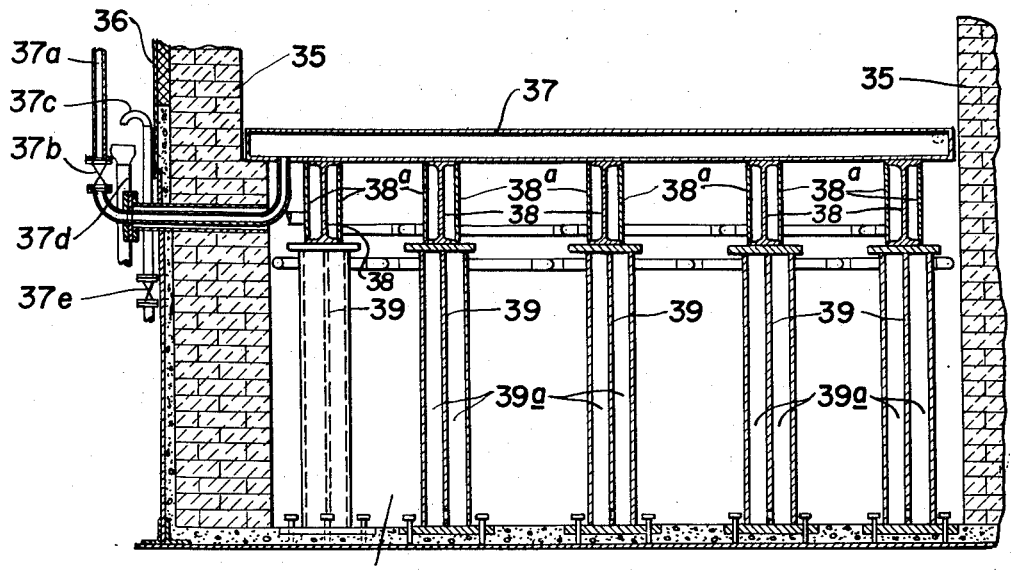
FIG. 2 is a vertical section through the lower portion of the stove for use in the system shown in FIG. 1, wherein the supporting structure is water-cooled.

With a stove construction as shown in FIG. 2, while it is contemplated that water may be used as the cooling medium, it is of course possible to circulate steam through the system of cooling ducts so as to effect a cooling of the metal with less cooling of the heated gases.

In lieu of using the circulating structure which is cooled as shown in FIG. 2, or in addition to the use of such a structure, the arrangement shown in diagram in FIG. 3 may be employed. In FIG. 3 the blast furnace stove is designated generally as 50, and the supporting structure for the brickwork is designated generally as 51, while the chamber under the brickwork is designated 52. The brickwork used in this stove is the so-called "basket weave" brickwork through which the gas can flow horizontally as well as vertically, this basket weave type of checker brick being common in the industry. A fragment of it is indicated schematically at 53.

In FIG. 3, 54 designates a duct leading from the cold blast blower into a heater schematically indicated at 55. This heater has two outlet ducts 56 and 57. Pipe 57 opens into the chamber 52 and may be provided with a valve 58. Pipe 56 leads to a bustle pipe or manifold 59 that encircles or partially encircles the stove, and which has a number of nozzles or tuyeres 60 that open directly into the brickwork above the structural steel that supports the brickwork. There may be a valve 56a in the pipe 56. It is contemplated that the heating means 55 may be a single unit or may be parallel units, but that the air delivered through the pipe 57 will be at a lower temperature than the air delivered through the pipe 56. With this arrangement the blast is divided and some of the air is introduced into the chamber 52 below the brickwork at a temperature at which it will not endanger the strength of the structural metal, while the air which is discharged through the pipe 56 and the tuyere 60 enters the stove above the structural support, and it can be at a much higher temperature. The structural support in this modification may be either a cooled structure as shown in FIG. 2, or a conventional structure. Even if it is only a conventional structure, the average temperature of all of the air may be substantially higher than if all of the air were introduced in the usual manner into the chamber 52. As a result a higher temperature blast can be delivered by the stove.

My invention therefore comprises a method of operating blast furnace stoves and a blast furnace stove system wherein the cold blast is preheated before it enters the stove, enabling the stove to always be at a higher temperature than where a cold blast is introduced, and enabling the hot blast produced by the stove to be at a consistently higher temperature. A further feature of the present invention is the provision for introducing air preheated to a temperature above that at which the supporting structure would normally be detrimentally affected, this being accomplished either by the cooling of the supporting structure, or by dividing the air flow so that part of the air which is cooler is introduced through the structural metal, while the part which is hotter is introduced into the stove above the supporting structure, or both of these last two arrangements may be used together.

While I have illustrated and described certain specific embodiments of my invention it will be understood that this is by way of illustration and that various changes and modifications may be made therein within the contemplation of my invention and under the scope of the following claims.

I claim:
1. The method of operating a blast furnace stove having a supporting structure for a column of brickwork comprising a heat exchange medium with an air chamber under the supporting structure, which comprises blowing air into the air chamber under the supporting structure and also blowing additional air which is preheated into the stove above the supporting structure, and mixing the two air streams in the brickwork of the stove.

2. The method of operating a blast furnace stove having a checker brick heat exchange medium therein and a supporting structure for the checker brick with an air chamber under the supporting structure which comprises blowing air toward the stove, dividing the flow of air moving toward the stove into two streams, heating one stream and introducing it into the air chamber of said stove, heating the other stream of air to a higher temperature than the first stream, and introducing the second stream into the stove above the supporting structure.

3. A blast furnace stove comprising a vertically elongated enclosure having a column of checker brick therein, a structural metal support for the checker brick, an air chamber being provided in the stove below said support, means for introducing a blast of preheated air into the chamber, and other means for introducing a second blast of preheated air into the column of brickwork above the support.

References Cited in the file of this patent
UNITED STATES PATENTS

| | | |
|---|---|---|
| 1,217,039 | Marshall | Feb. 20, 1917 |
| 1,316,086 | Dovel | Sept. 16, 1919 |
| 2,232,121 | Linder | Feb. 18, 1941 |
| 2,376,099 | Swartz | May 15, 1945 |
| 2,542,680 | Kinney et al. | Feb. 20, 1951 |